US007145912B1

(12) United States Patent
Schwartz et al.

(10) Patent No.: US 7,145,912 B1
(45) Date of Patent: Dec. 5, 2006

(54) DEMULTIPLEXING A STATISTICALLY MULTIPLEXED MPEG TRANSPORT STREAM INTO CBR SINGLE PROGRAM TRANSPORT STREAMS

(75) Inventors: Mayer D. Schwartz, Portland, OR (US); Ryan P. Hegar, Clackamas, OR (US)

(73) Assignee: Tut Systems, Inc., Lake Oswego, OR (US)

( * ) Notice: Subject to any disclaimer, the term of this patent is extended or adjusted under 35 U.S.C. 154(b) by 0 days.

(21) Appl. No.: 09/535,676

(22) Filed: Mar. 23, 2000

(51) Int. Cl.
*H04L 12/56* (2006.01)
(52) U.S. Cl. .................... 370/395.7; 370/412
(58) Field of Classification Search ............ 370/395.1, 370/395.61, 395.7, 536, 412
See application file for complete search history.

(56) References Cited

U.S. PATENT DOCUMENTS

| | | | |
|---|---|---|---|
| 5,287,182 A * | 2/1994 | Haskell et al. .............. | 348/500 |
| 5,521,922 A * | 5/1996 | Fujinami et al. ............ | 370/543 |
| 5,534,937 A | 7/1996 | Zhu et al. | |
| 5,566,208 A | 10/1996 | Balakrishnan | |
| 5,847,765 A | 12/1998 | Sanpei | |
| 6,052,384 A * | 4/2000 | Huang et al. ............... | 370/468 |
| 6,529,552 B1 * | 3/2003 | Tsai et al. .............. | 375/240.05 |

FOREIGN PATENT DOCUMENTS

| | | | |
|---|---|---|---|
| EP | 0692911 A2 * | 1/1996 | |
| GB | 2356323 A * | 5/2001 | |
| WO | WO 97/38532 | 10/1997 | |
| WO | WO 01/39505 A2 * | 5/2001 | |

OTHER PUBLICATIONS

VIDEOTELE.COM: "Video Tele.com, a Tekronix Company, Adds New Functionally to Its Digital Headend Solutions for Full Service Networks" Videotele-Immediate Release, (Online) Mar. 20, 2000 pp. 1-2, XP002186237 Beaverton. Retrieved from the internet: URL:http://www.videotele.com/about/press_032000.html (retrieved on Dec. 19, 2001) paragraphs 0004, 0005.

* cited by examiner

*Primary Examiner*—Derrick Ferris
(74) *Attorney, Agent, or Firm*—Smith-Hill and Bedell, P.C.

(57) ABSTRACT

A constant bit rate single program encoded transport stream is demultiplexed from a statistically multiplexed MPEG transport stream by separating a variable bit rate program from the multiplexed MPEG transport stream, loading the sequence of pictures that form the variable bit rate program into a smoothing buffer at a rate that does not exceed a desired constant bit rate and transferring the picture from the smoothing buffer at times indicated by decode time stamps associated with the pictures respectively. If a picture of the sequence becomes available no later than a specified amount of time prior to the picture's decode time stamp, then that picture is loaded into the smoothing buffer commencing the specified amount of time prior to the time indicated by the picture's decode time stamp. If a picture of the sequence becomes available later than the specified amount of time prior to the picture's decode time stamp, then that picture is loaded into the smoothing buffer as soon as possible.

6 Claims, 3 Drawing Sheets

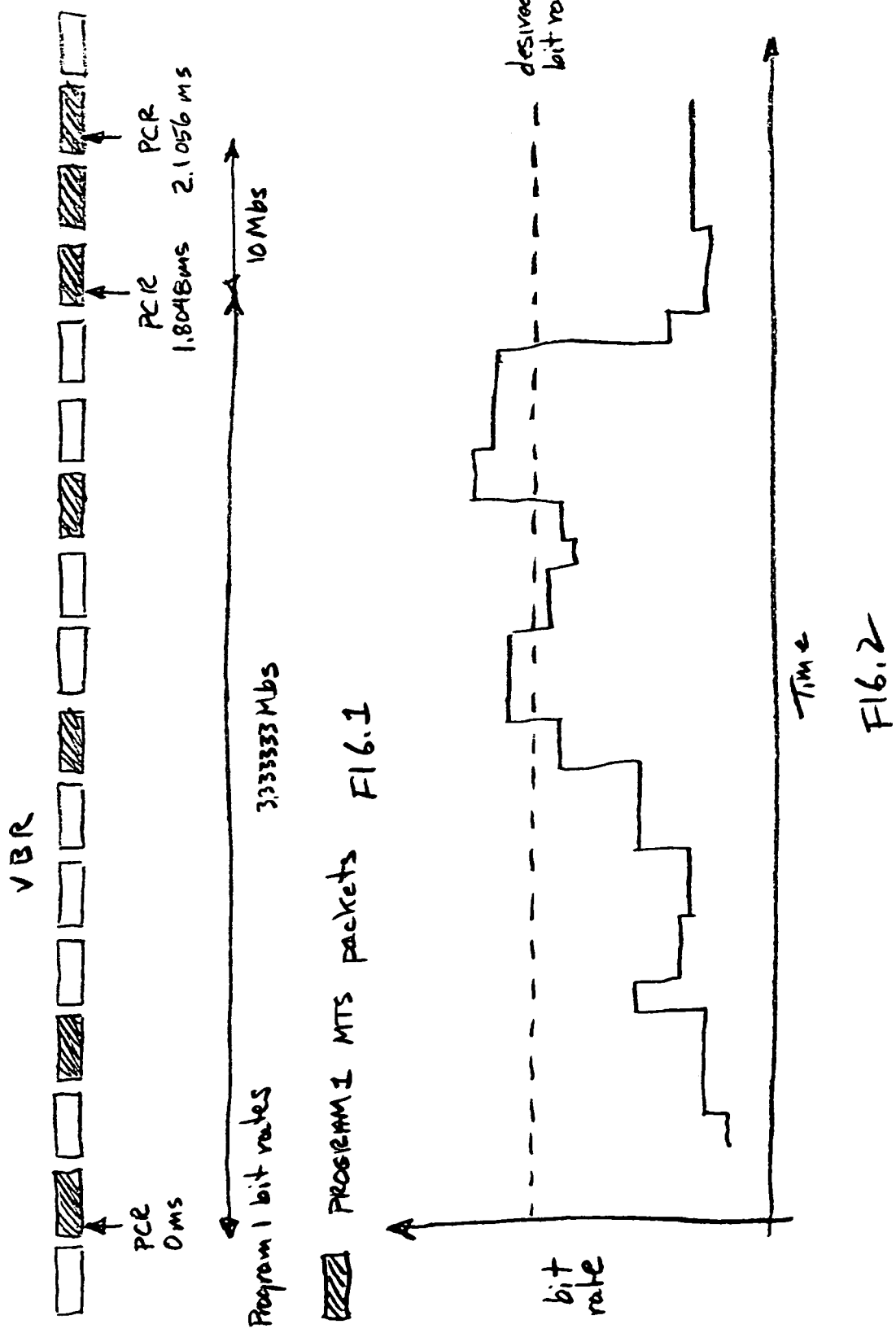

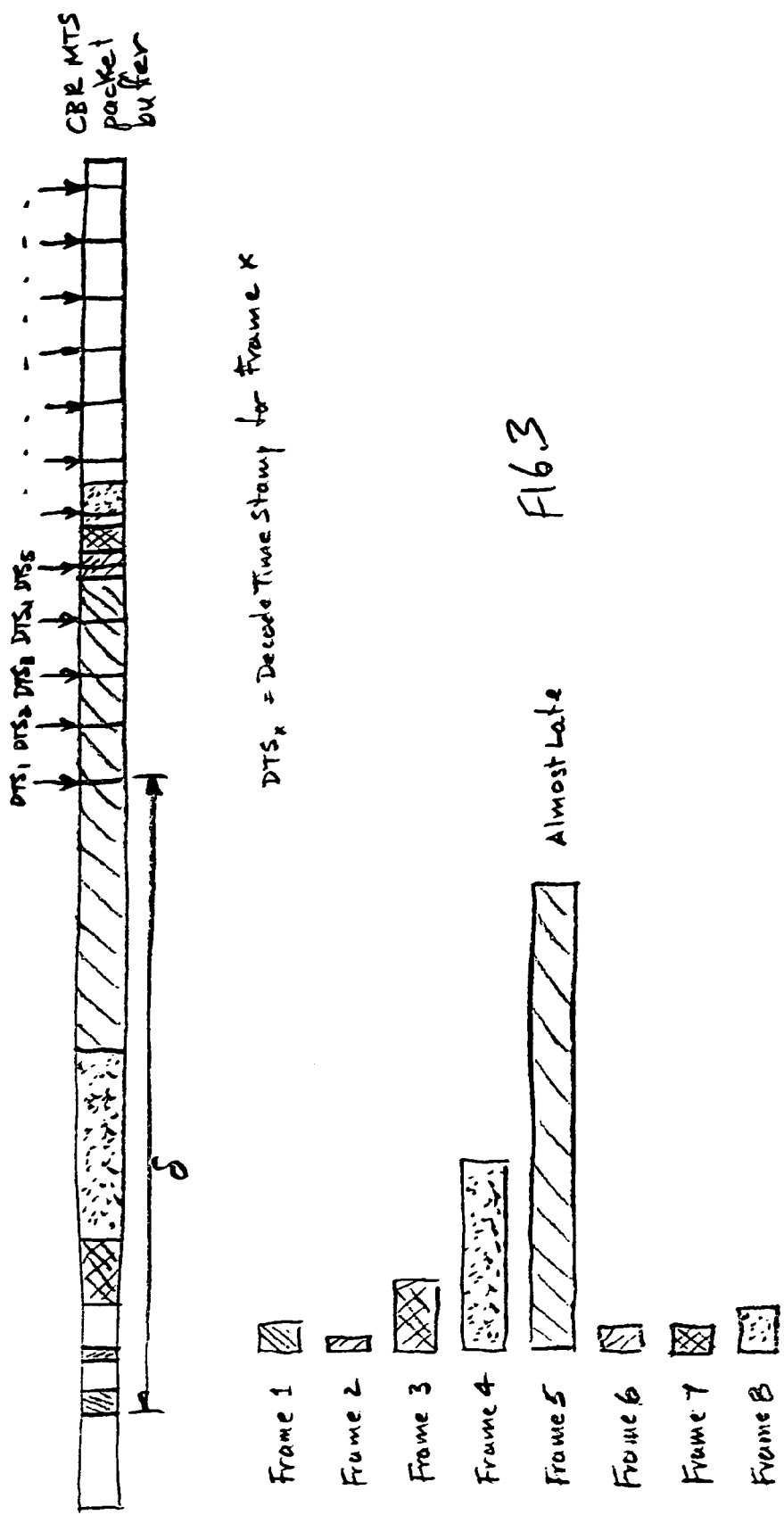

DEMULTIPLEXING A STATISTICALLY MULTIPLEXED MPEG TRANSPORT STREAM INTO CBR SINGLE PROGRAM TRANSPORT STREAMS

BACKGROUND OF THE INVENTION

The present invention relates to video compression, and more particularly to a simple method for demultiplexing a statistically multiplexed MPEG transport stream (MPTS) into constant bit rate (CBR) single program transport streams (SPTSs) without making any changes to the video elementary streams.

The video elementary streams in the MPTS are all typically encoded with a variable bit rate (VBR). If the desired constant bit rate is too low, for instance if the constant bit rate of the CBR stream is less than the average bit rate of the VBR stream, it becomes impossible to demultiplex a single stream from the MPTS without modifying the video elementary stream. Even in this case however, it is usually possible to reduce the potential for visual artifacts by replacing B-type pictures with null B-type pictures.

Prior efforts that achieve the demultiplexing of a statistically multiplexed MPTS into multiple CBR SPTSs do so by modifying (transcoding) the video streams. This is a compute intensive process and can negatively impact the quality of the resultant video. Examples of such products are the CherryPicker 7000 video re-multiplexer from Terayon Communication Systems located in Santa Clara, Calif., United States of America and possibly the PS5030 Multiplexer Module from PixStream Incorporated located in Waterloo, Ontario, Canada.

In a statistically multiplexed MPTS, video streams are encoded as VBR with a wide distribution of bit rates per picture. The transport packets (TPs) for a given video stream arrive in almost as bursty a pattern, though there is some smoothing. What is desired is to fit a complete SPTS with VBR video and CBR audio within a CBR network connection without recoding or modifying the video in any way.

BRIEF SUMMARY OF THE INVENTION

Accordingly the present invention provides a simple method for demultiplexing a statistically multiplexed MPEG transport stream into CBR single program transport streams without recoding or modifying the video in any way. The method starts sending a picture at a fixed interval, on the order of tens or hundreds of milliseconds, before it is to be decoded or as soon thereafter as possible. A separate logical smoothing buffer is used for each variable bit rate single program transport stream. When the decode time arrives the picture is transferred from the smoothing buffer for decoding. In the event there is buffer overflow, B-type frames are replaced with null B-type frames, which has the effect of a freeze frame by repeating the prior decoded picture, until the overflow condition ceases.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is an illustrative view of a statistically multiplexed MPEG Transport Stream having variable bit rate single program transport streams.

FIG. 2 is an illustrative view of the relationship between the input variable bit rate single program transport stream and the constant bit rate single program transport stream produced using a smoothing buffer according to the present invention.

FIG. 3 is an illustrative timing view showing the loading of the pictures into the smoothing buffer at the constant bit rate starting at a fixed time prior to the decode time, or as soon as possible thereafter, according to the present invention.

DETAILED DESCRIPTION OF THE INVENTION

Figure 4:
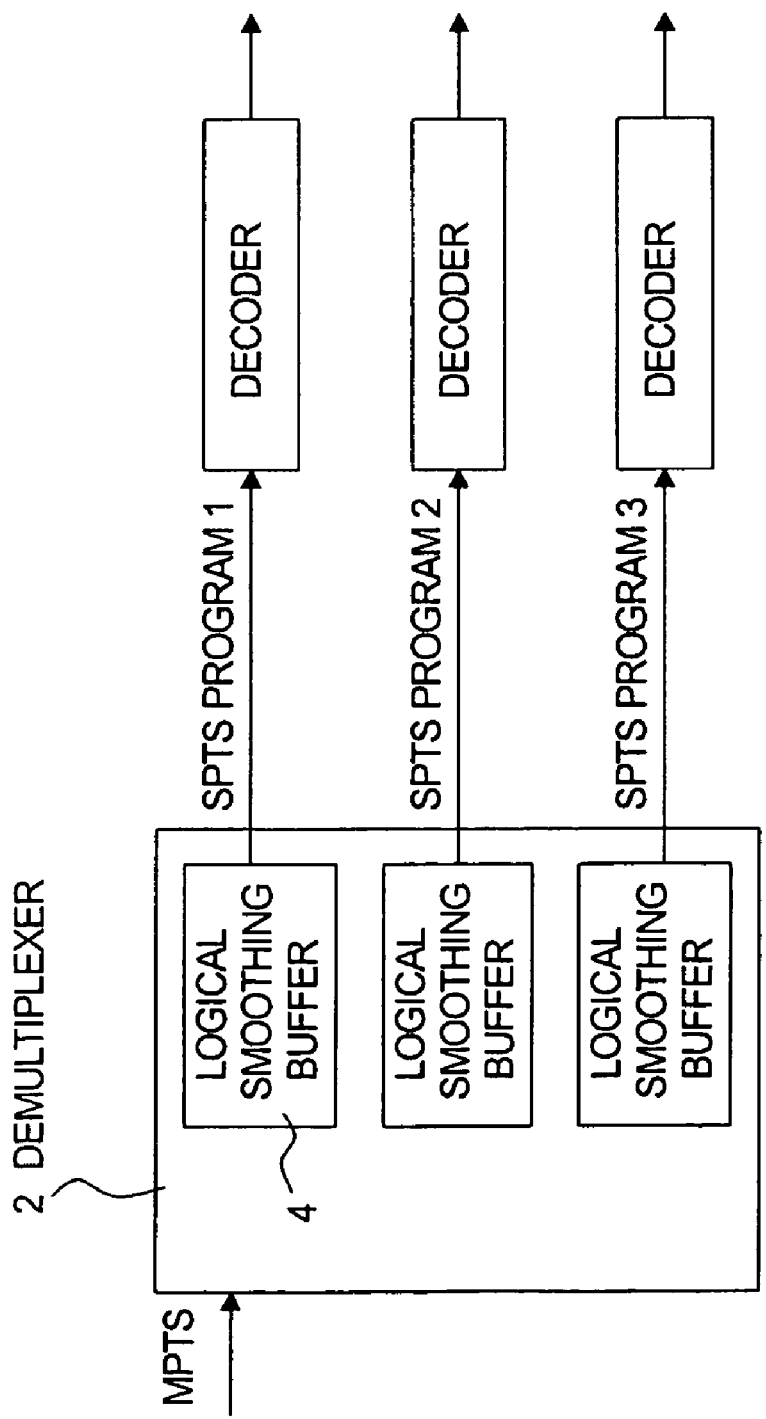
FIG. 4 is a simplified functional block diagram illustrating the demultiplexer and a system target decoder.

Referring now to FIG. 1 a statistically multiplexed MPEG Transport Stream (MPTS) having a plurality of programs of variable bit rates multiplexed together is illustrated. The shadowed packets represent a single program transport stream, the packets of which all are a part of the same program, Program 1. As shown between PCR 0 ms and PCR 1.8048 ms Program 1 has one-third of the packets that are interleaved with those of other programs at an MPTS stream rate of 10 Mbs, i.e., 0.1504 ms per MTS packet. The bit rate for Program 1 over that interval is 3.33333 Mbs. Between the next two PCRs at 1.8048 ms and 2.1056 ms are only two Program 1 packets with no interleaved packets so the Program 1 bit rate is that of the MTS stream, i.e., 10 Mbs. The different rates for Program 1 depend upon, for example, image complexity and the type of MPEG frame—I, P or B.

Referring to FIG. 4, the MPTS is delivered to a demultiplexer 2 for separation into multiple single program transport streams (SPTSs). The demultiplexer separates Program 1 from the MPTS based upon the packet PIDs, and loads Program 1 into a logical smoothing buffer 4 at the desired constant bitrate. The buffer 4 outputs Program 1 to produce an SPTS having a Constant Bit Rate (CBR). The SPTS (CBR) may then be decoded at the time indicated by the decode time stamp (DTS) for each frame to recover the original images in the video stream.

As shown in FIG. 2 for an SPTS (VBR) that has an Average Bit Rate (ABR) less than the desired CBR, there may be times when the SPTS (VBR) exceeds the desired CBR. During such times and in the absence of the present invention this could cause a downstream decoder's buffer to overflow and thus pictures received by the decode would not be decoded. This would result in the decoder repeatedly outputting the last successfully decoded frame until the overflow condition ends and the next complete frame is available for the decoder at the time indicated by the frame's associated decode time stamp (DTS). To reduce the likelihood of an occurrence of this undesired anomaly, the solution according to the present invention is to start loading the smoothing buffer early with the packets for a frame so that when the frame's decode time comes, the full data for the frame is available for decoding, as illustrated in FIG. 3 and described in more detail below.

$Buf_n$ represents the smoothing buffer for variable bit rate (VBR) video elementary stream n within a statistically multiplexed MPEG transport stream (MPTS). The variable $td_n(j)$ is a decode time for the j'th picture of the video elementary stream $\underline{n}$ in a system target decoder. Decode time is measured in seconds and is with respect to a system clock PCR for the program containing elementary stream $\underline{n}$. The variable $t_n^i(j)$ is a time at which the i'th transport stream (TS) packet of the j'th picture of elementary stream $\underline{n}$ enters the smoothing buffer $Buf_n$. Again time is measured in seconds and is with respect to the system clock for the program containing elementary stream $\underline{n}$. $R_n$ is based on the desired bit rate shown in FIG. 2—it is the desired bit rate less the bit rate of the packets in the SPTS not carrying video. $R_n$ is a constant rate at which the TS packets with the video elementary stream $\underline{n}$ enter the smoothing buffer $Buf_n$. The rate is given in units of bits per second. Finally $\delta_n$ is the earliest time before the decode time that a video elementary stream TS packet can enter the smoothing buffer $Buf_n$. Again time is given in seconds.

The buffer size is given by $|Buf_n|=R_n\delta_n$. TS packets containing video elementary stream $\underline{n}$ enter $Buf_n$ as early as possible subject to the following constraints:

1. The rate at which the packets can enter $Buf_n$ is limited by $R_n$.
2. For any picture j of video elementary stream $\underline{n}$ and for all TS packets containing picture j, $t_n^i(j)+\delta_n \geq td_n(j)$.
3. At time $td_n(j)$ all of the packets $t_n^i(j)$ are removed.
4. If the buffer $Buf_n$ is full, i.e., contains $R_n\delta_n$ bits, then no new packets can enter.

The buffer model is satisfied if the buffer $Buf_n$ never overflows or underflows. An overflow occurs when for any picture j of video elementary stream $\underline{n}$ and any TS packet containing picture j, $t_n^i(j)>td_n(j)$.

In the event of overflow a B-type frame is replaced by a null B-type frame until the overflow ceases, which has the effect of repeating the prior video frame by the decoder.

The above is illustrated in FIG. 3 where a series of frames of variable bit rates is shown. At time $\delta$ before the DTS for frame 1, frame 1 is loaded into the buffer. The buffer may be thought of as having a plurality of equal capacity slots between consecutive DTS times. Since frame 1 has fewer bits than the capacity of one slot, there is a gap before frame 2 is loaded into the buffer, again at time $\delta$ before the DTS for frame 2. Likewise frame 3 is loaded at time $\delta$ before $DTS_3$. Frame 3 has more bits than fit into one slot, so that frame 4 is loaded into the buffer as soon as possible thereafter. Then frame 5 is loaded into the buffer as soon as possible. The end of frame 5 almost exceeds the DTS time for frame 5 and the buffer is in danger of overflowing. However the next few frames 6, 7 and 8 each have fewer bits than one slot so that the capacity of the buffer is alleviated.

Thus the present invention provides for demultiplexing a statistically multiplexed MPEG transport stream into a constant bit rate single program transport stream using a smoothing buffer with the video pictures in the stream being loaded into the smoothing buffer at the desired constant bit rate as early as possible up to a fixed time interval before the pictures need to be decoded.

What is claimed is:

1. A method of demultiplexing a statistically multiplexed MPEG transport stream into a constant bit rate single program transport stream comprising the steps of:

separating a specified single program transport stream including a variable bit rate program composed of a sequence of pictures, each picture having a decode time stamp, from the statistically multiplexed MPEG transport stream;

loading a j'th picture from the variable bit rate program into a smoothing buffer at a desired constant bit rate, in the event that loading of the j'th picture into the smoothing buffer is completed no later than a time $\delta$ before the time indicated by the decode time stamp of the (j+1)'th picture, loading the (j+1)'th picture into the smoothing buffer at said desired constant bit rate starting at the time $\delta$ before the time indicated by the decode time stamp of the (j+1)'th picture, in the event that loading of the j'th picture into the smoothing buffer is not completed until later than the time $\delta$ before the time indicated by the decode time stamp of the (j+1)'th picture, loading the (j+1)'th picture into the smoothing buffer at said desired constant bit rate starting substantially immediately after loading of the j'th picture is completed, and transferring the (j+1)'th picture from the smoothing buffer at the time indicated by the decode time stamp of the (j+1)'th picture.

2. A method according to claim 1, wherein the smoothing buffer has a capacity equal to said desired constant bit rate multiplied by $\delta$.

3. A method of adjusting bit rate of a variable bit rate single program transport stream having an average bit rate less than a desired constant bit rate and having a maximum bit rate greater than said desired constant bit rate, the single program transport stream being composed of a sequence of pictures each having a decode time stamp, the method comprising the steps of:

(a) loading a j'th picture of the sequence into a smoothing buffer, (b) transferring the j'th picture from the smoothing buffer for decoding, (c)(1) in the event that loading of the j'th picture into the smoothing buffer is completed no later than a time $\delta$ before the time indicated by the decode time stamp of the (j+1)'th picture, loading the (j+1)'th picture into the smoothing buffer at said desired constant bit rate starting at the time $\delta$ before the time indicated by the decode time stamp of the (j+1)'th picture, (c)(2) in the event that loading of the j'th picture into the smoothing buffer is not completed until later than the time $\delta$ before the time indicated by the decode time stamp of the (j+1)'th picture, loading the (j+1)'th picture into the smoothing buffer at said desired constant bit rate starting substantially immediately after loading of the j'th picture is completed, and (d) transferring the (j+1)'th picture from the smoothing buffer at the time indicated by the decode time stamp of the (j+1)'th picture.

4. A method according to claim 3, wherein the single program transport stream is one stream of a statistically multiplexed MPEG transport stream having a plurality of variable bit rate single program streams multiplexed together and each composed of a sequence of pictures each having a decode time stamp, and the method comprises, before step (a):

providing a plurality of smoothing buffers for said plurality of single program transport streams respectively, and separating said single program transport streams from the statistically multiplexed MPEG transport stream, and step (a) comprises, for each single program transport stream, loading the j'th picture from the variable bit rate program into the smoothing buffer provided for that single program transport stream.

5. A method according to claim 4, wherein step (c)(1) comprises, for each single program transport stream, in the event that loading of the j'th picture of the single program transport stream into the smoothing buffer provided for that single program transport stream is completed no later than a time $\delta$ before the time indicated by the decode time stamp of the (j+1)'th picture, loading the (j+1)'th picture of the single program transport stream into the smoothing buffer provided for that single program transport stream at said desired constant bit rate starting at the time δ before the time indicated by the decode time stamp of the (j+1)'th picture.

6. A method according to claim 5, wherein step (c)(2) comprises, for each single program transport stream, in the event that loading of the j'th picture of the single program transport stream into the smoothing buffer provided for that single program transport stream is not completed until later than the time δ before the time indicated by the decode time stamp of the (j+1)'th picture, loading the (j+1)'th picture of the single program transport stream into the smoothing buffer provided for that single program transport stream at said desired constant bit rate starting substantially immediately after loading of the j'th picture is completed.

* * * * *